(12) United States Patent
Warner et al.

(10) Patent No.: US 8,143,339 B2
(45) Date of Patent: Mar. 27, 2012

(54) NANOCOMPOSITE POLYMERS

(75) Inventors: Steven B. Warner, South Dartmouth, MA (US); Prabir K. Patra, New Bedford, MA (US); Sandeep Razdan, Cohoes, NY (US)

(73) Assignee: University of Massachusetts, Shrewsbury, MA (US)

( * ) Notice: Subject to any disclaimer, the term of this patent is extended or adjusted under 35 U.S.C. 154(b) by 882 days.

(21) Appl. No.: 11/860,892

(22) Filed: Sep. 25, 2007

(65) Prior Publication Data

US 2008/0249228 A1 Oct. 9, 2008

Related U.S. Application Data

(63) Continuation of application No. PCT/US2006/010542, filed on Mar. 24, 2006.

(60) Provisional application No. 60/665,409, filed on Mar. 25, 2005.

(51) Int. Cl.
*C08K 3/36* (2006.01)

(52) U.S. Cl. ........ 524/493; 524/570; 524/571; 524/560; 524/577

(58) Field of Classification Search .............. 524/493, 524/570, 571, 560, 577
See application file for complete search history.

(56) References Cited

U.S. PATENT DOCUMENTS

| | | | | |
|---|---|---|---|---|
| 6,762,233 | B2 * | 7/2004 | Chaiko | 524/445 |
| 2003/0031438 | A1 * | 2/2003 | Kambe et al. | 385/122 |
| 2004/0234724 | A1 * | 11/2004 | Kaminsky et al. | 428/141 |
| 2005/0027040 | A1 * | 2/2005 | Nelson et al. | 523/216 |

FOREIGN PATENT DOCUMENTS

WO    WO-2006/104822 A2 * 10/2006

OTHER PUBLICATIONS

Razdan et al., "Spherulitic Morphology and Thermal Stability of PP/ZnO Nanocomposites," Mat. Res. Soc. Svm~. Proc.. 799:L8.50. 1-L8.50.6 (2004].*
Chiang et al., "Synthesis, characterization, thermal properties and flame retardance of novel phenolic resin/silica nanocomposites," Polymer Degradation and Stability, 83: 207-214 (2004).
Garcia et al., "Polypropylene/SiO$_2$ Nanocomposites With Improved Mechanical Properties", Rev. Adv. Mater. Sci., 6: 169-175, (2004).
Gilman et al., "New Flame Retardants Consortium: Final Report Flame Retardant Mechanism of Silica," NIST, NISTIR 6357:1-24, Jun. 1999.
Kashiwagi et al., "Flame Retardant Mechanism of Silica Gel/Silica", Fire and Materials, 24: 277-289, (2000).
Kashiwagi et al., "Flame-Retardant Mechanism of Silica: Effects of Resin Molecular Weight," J. Applied Polymer Sci. 87: 1541-1533 (2003).
Kashiwagi et al., "Thermal and Flammability Properties of a Silica-Poly(methylmethacrylate) Nanocomposite," J. Applied Polymer Sci. 89: 2072-2078 (2003).
Razdan et al., "Morphological and thermal effects of nano-ZnO on polypropylene", Polymeric Materials: Science & Engineering, vol. 89, pp. 721-722, 2003.
Razdan et al., "Nano-Engineered Flame Retardant Polymer Composites," Composites, 2004: 1-5 (Oct. 6-8, 2004).
Razdan et al., "Spherulitic Morphology and Thermal Stability of PP/ZnO Nanocomposites," Mat. Res. Soc. Symp. Proc., 799: L8.50. 1-L8.50.6 (2004).

* cited by examiner

*Primary Examiner* — Peter D. Mulcahy
*Assistant Examiner* — Henry Hu
(74) *Attorney, Agent, or Firm* — Fish & Richardson P.C.

(57) ABSTRACT

Nanocomposite compositions containing a graft polymer and a filler such as nano-sized silica having flame resistant properties are described.

27 Claims, 13 Drawing Sheets

NANOCOMPOSITE POLYMERS

CROSS-REFERENCE TO RELATED APPLICATION

This application is a continuation of, and claims priority under 35 U.S.C. 120 from, International Application No. PCT/US2006/010542, filed Mar. 24, 2006, which claims priority from U.S. Provisional Patent Application Ser. No. 60/665,409, filed on Mar. 25, 2005, which is incorporated herein by reference in its entirety.

TECHNICAL FIELD

The invention relates to polymers, and more particularly to nanocomposite polymers, e.g., flame retardant nanocomposite polymers.

BACKGROUND

Nanocomposites are usually polymer composite systems in which nano-sized (typically 1-100 nm) fillers are dispersed in a polymer matrix. The thermal and mechanical behaviors of these systems are typically different from the behaviors of the polymers themselves, or the behaviors of polymer composite systems containing micro-sized or larger fillers. For example, polymers such as polypropylene, polystyrene, and polyester are flammable, and have to be treated with flame retardant material to make them flame resistant.

SUMMARY

The invention is based, at least in part, on the discovery that by mixing graft polymers with a nano-sized hydrogen-bonding filler such as silica, one can obtain nanocomposite compositions that have a much higher flame resistance, increased char formation, greater structural stability of char, increased decomposition temperature, decreased heat release rate, decreased mass loss rate, decreased peak smoke production, decreased average smoke production, and/or decreased production of carbon dioxide, than in polymer compositions that lack graft polymers.

In general, the invention features nanocomposite compositions that include a graft polymer and nano-sized silica. The nanocomposite compositions can further include another non-graft polymer. The polymers can include one or more polyolefins (e.g., polypropylenes), polydienes, polyacrylates, polystyrenes, polysiloxanes, polyethers, poly(vinyl aromatics), poly(vinyl halides), epoxies, polycarbonates, silicones, polyesters, synthetic rubbers, polyurethanes, nylons, polyketones, or poly(phenylene oxides). The nano-sized silicas can be fumed silica, colloidal silica, or fused silica. The nanocomposite compositions can include 1% to 50% by weight silica (e.g., 20, 25, 35, or 40% by weight). The nano-sized silica can have a particle size in the range of about 1 nm to 500 nm (e.g., 3.5, 7, 10, 15, 20, 25, 30, 50, or 100 nm). In various embodiments, the grafting agent includes an acid anhydride, arylalkene, alkene, alkoxyallene, acid, carboxyalkene, alkene carboxylate, imide, or arylimide (e.g., maleic anhydride, styrene, vinyl ether of ethanol amine, vinyl, acrylic acid, or maleimides with hindered phenols), or a combination of one or more of these agents. The nanocomposite composition can include 0.5% to 98% (e.g., 2, 5, 10, 20, 30, 40, 50, 60, 70, 80, 90, or 95%) by weight of the graft polymer. The nanocomposite composition can further include a fire retardant.

The nanocomposite composition can have one or more of the following properties: enhanced flame resistance, increased char formation, greater structural stability of char, increased decomposition temperature, decreased heat release rate, decreased mass loss rate, decreased peak smoke production, decreased average smoke production, and/or decreased production of carbon dioxide, compared to a composition including no graft polymer.

In another embodiment, the invention features methods of synthesizing a nanocomposite composition by mixing a graft polymer with nano-sized silica to form a mixture, and melt blending the mixture. The methods can further include mixing the nanocomposite composition with another non-graft polymer or a fire retardant, or both. In another embodiment, the invention features methods of making plastic articles by processing the new nanocomposite compositions described herein to form the article.

In another embodiment, the invention features using the new nanocomposite compositions to make packaging materials, thermal insulators, flame retardant fabrics, protective garments, composite films, molded plastics, automotive components, aviation components, furniture materials, mattress materials, furniture fabrics, clothing fabrics, carpets, or construction materials.

As used herein, a graft polymer is a polymer modified with a grafting agent.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

BRIEF DESCRIPTION OF DRAWINGS

FIGS. 10A and 10B represent polypropylene/silica 5%, FIGS. 10C and 10D represent polypropylene/silica 10%, FIGS. 10E and 10F represent graft polypropylene (maleic anhydride)/silica 5%, and FIGS. 10G and 10H represent graft polypropylene/ silica 10%.

DETAILED DESCRIPTION

Figure 1A:
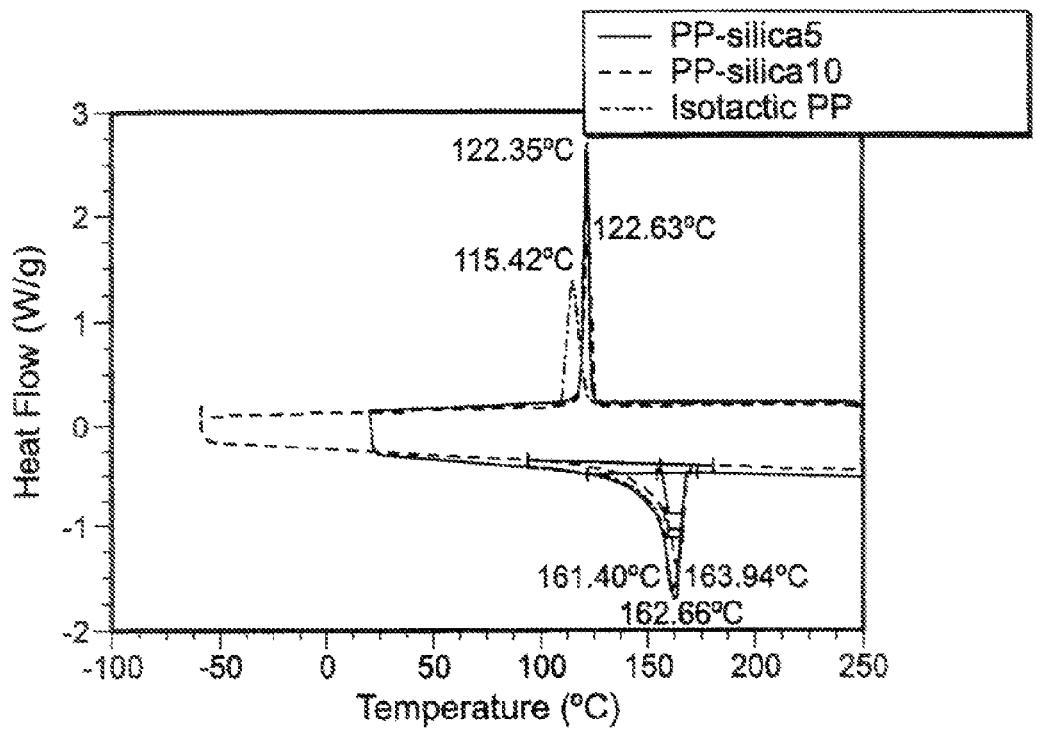
FIGS. 1A and 1B are comparative analysis differential scanning calorimetry curves at two different loading levels of 5% and 10% fumed silica for polypropylene and maleic anhydride grafted polypropylene, respectively.

The nanocomposite compositions described herein include at least one graft polymer and a nanoscale filler, such as nano-sized silica. The nanocomposite compositions can also include one or more other, non-graft, polymers. The new compositions can also include fire retardants, other fillers, colorants, and additives.

Graft Polymers

A graft polymer is a polymer in which the main backbone chain has attached to it at various points, grafting agents, which are side chains containing groups that are different from groups in the main chain. The graft polymer is synthesized from a base polymer (homopolymer or a copolymer) and a grafting agent using a grafting process. Graft polymers, and methods of making graft polymers are described by Battaerd et al., "*Graft Copolymers*": Published New York, Interscience Publishers (1967). The base polymer that is used to host the graft can be a hydrophobic polymer, e.g., a polymer that does not have functional groups that can form hydrogen bonds, e.g., polyethylene, polypropylene, or polystyrene.

Polymers that can be used in the present nanocomposite compositions include epoxy, polycarbonate, silicone, polyester, polyether, polyolefin, synthetic rubber, polyurethane, nylon, and polystyrene, and poly(vinylaromatic), acrylic, polyamide, polyimide, phenolic, poly(vinylhalide), poly (phenylene oxide), and polyketone and copolymers and blends thereof. Copolymers include alternating, random and block copolymers (e.g., high impact polystyrene, ethylene vinyl acetate copolymers, and ethylene acrylic ester copolymers). Polyolefins include polybutylene, polypropylene and polyethylene, such as low density polyethylene, medium density polyethylene, high density polyethylene, and ethylene copolymers; poly(vinylaromatics) include polystyrene polymers and copolymers and poly(methylstyrene) polymers and copolymers; acrylate resins include polymers and copolymers of acrylate and methacrylate esters, polyamide resins include nylon 6, nylon 11, and nylon 12, as well as polyamide copolymers and blends thereof, polyester resins include polyalkylene terephthalates, such as poly(ethylene terephthalate) and poly(butylene terephthalate), as well as polyester copolymers; synthetic rubbers include styrene-butadiene and acrylonitrile-butadiene-styrene copolymers and; polyketones include poly(etherketones). These polymers can be reacted with grafting agents to synthesize graft polymers.

Grafting Agents

A grafting agent is a group of atoms that forms the side chains of a graft polymer and can impart various properties to the polymer. The grafting agents used to make a graft polymer can be compounds that have functional groups that can form hydrogen bonds, e.g., acids, anhydrides, or alcohols. Without being bound by theory, it is believed that the grafting agents on the graft polymer backbones can form hydrogen bonds with the nano-sized silica, which is believed to impart flame resistance to the polymer composition. Grafting agents that can be used to prepare the new nanocomposites include arylalkenes, alkenes, alkoxyalkenes, acids, carboxyalkenes, alkenecarboxylates, imides, arylamides, maleic anhydride, styrene, vinyl ether of ethanol amine, vinyl, acrylic acid, or maleimides with hindered phenols.

Fillers

A filler is a relatively inert material added to a polymer to increase volume or to alter its physical, mechanical, thermal, or electrical properties. A filler used as a flame retardant additive interferes in the burning process by acting either in the solid phase (condensed phase chemistry) or in the gaseous phase. The fillers' mode of action can be a physical or a chemical change in combustion of the polymer.

A physical change in combustion can be produced by a cooling effect, formation of a protective layer, or formation of inert gases. When a filler has a cooling effect it lowers the temperature below that required to sustain combustion. For example, aluminum trihydrate (ATH) releases its water of hydration at high temperatures, which retards the combustion of the base polymer to which ATH is added as filler. When a filler forms a protective layer on the surface of the polymer undergoing combustion, the layer acts as a shield protecting the inner combustible polymer layer from the proceeding flame front. This protective layer impedes the heat transfer rate from the combustion environment to the polymer, thereby lowering the rate of heating of the polymer. This process also cuts off the oxygen supply and contact with other pyrolyzing gases. Thus, the heat release and mass loss rates for the burning polymer are lowered which, depending on the physical integrity of the char, can also lead to flame extinction.

In early combustion, the gases emanating from the heated polymer surface form a combustible mixture which, upon ignition, causes a flame. When a filler forms an inert gas, it dilutes the combustible gas mixture emanating from the polymer surface. For example, halogen-containing flame retardants form inert gases upon decomposition, dilute the pyrolyzing gas mixture, and cause delay in ignition and lowering of the heat released.

A chemical change in combustion can be produced either in a gaseous or solid state. The fillers that act in the gaseous phase do so by quenching the free radicals generated during the combustion process. These free radicals might be the oligomeric or monomeric species formed as a result of pyrolysis. By interrupting their generation, the fillers hinder the exothermic processes involved, and thus help to cool the system. The supply of flammable gases is reduced and burning may eventually be completely suppressed.

Some flame retardants alter the condensed phase chemistry of burning. Some fillers dehydrogenate to generate double bonds. This process causes cyclization and cross-linking of carbon atoms to form a surface carbonaceous layer. The layer acts as a thermal and mass transport barrier and enhances the flame resistance of the polymer.

Nano-sized fillers have large specific surface area compared to conventional fillers. This surface area often enables them to impart significant property enhancements to a base polymer at filler concentrations of only 2-10%. One of the significant properties imparted by the addition of nanofillers is enhanced flame resistance to the base polymer. Nano-sized fillers that can be used in the present invention are nano-sized silica, fumed silica, colloidal silica, fused silica, and silicates. Without being bound by theory, it is believed that the silica can interact with polar organic compounds like ethers, acids, anhydrides, or amides via the formation of hydrogen bonds between the silanol groups present in silica and the oxygen or nitrogen of the corresponding ether or acid, anhydride, or amide.

Nano-sized silica can have a particle size ranging from about 1 nm to 100 nm. For example, 1 nm, 3.5 nm, 7 nm, 10 nm, 15 nm, 20 nm, or 50 nm. Size distribution of the nanoparticles can be narrow. A narrow particle size distribution is defined as one in which greater than 90% of the particles have a particle size in the range of 0.2-2 times the mean particle size. For example, greater than 95%, or greater than 99% of the particles have a particle size in this range.

Nanocomposite Compositions

Nanocomposite compositions described herein can be synthesized by mixing the graft polymer with the filler. For example, compositions can be prepared by mixing the graft polymer with the nano-sized silica and melt blending with a screw melt mixing instrument. Nanocomposite compositions can also be prepared by mixing and melt blending the graft polymer with varying weight percentages of another polymer and filler. Compositions containing other additives such as fire retardants can be prepared by mixing the additive with the graft polymer and filler. The nanocomposite composition can contain from 0.5-99.5% by weight of the graft polymer. For example, the nanocomposite composition can contain 1%, 2%, 5%, 10%, 15%, 20%, 25%, 30%, 50%, 60%, 70%, 80%, 90%, 95%, or 98% by weight of the graft polymer.

The graft polymer can contain from 0.1-50% by weight of the grafting agent. For example, the graft polymer can contain 1%, 2%, 5%, 10%, 15%, 20%, 25%, 30%, or 50% by weight of the grafting agent. The nanocomposite composition can contain from 0.1-50% by weight of the filler. For example, the nanocomposite composition can contain 1%, 2%, 5%, 10%, 15%, 20%, 25%, 30%, or 50% by weight of the filler.

The polymers (e.g., polypropylene), graft polymers (e.g., polypropylene grafted with maleic anhydride), grafting agents, (e.g., maleic anhydride) fillers (e.g., fumed silica) and additives (e.g., fire retardants) described herein can be obtained from commercial sources (e.g., the Sigma-Aldrich Corporation, Southern Clay Products, RTP Company, or Nanophase Technology Corporation) and can be prepared by conventional techniques, including polymerization or chemical synthesis.

A nanocomposite composition containing a graft polymer with varying amounts of filler can be prepared by mixing graft polymer with a desired amount of filler followed by melt blending (e.g., at 10, 50 or 100 rpm) to achieve good dispersion. Similarly, a nanocomposite composition containing graft polymer with varying amounts of filler and another polymer can be prepared by mixing graft polymer with varying amounts of filler and another polymer followed by melt blending to achieve good dispersion.

After melt blending, the nanocomposite compositions can be compression molded into films, e.g., about 0.5-1.0 mm thick, and these films can be used for characterization experiments. Differential scanning calorimetry (DSC) can be performed on samples with different loading levels of fumed silica in different nanocomposite compositions. Comparison of DSC cooling curves can provide the peak crystallization temperature for the tested samples.

Thermogravimetric analysis (TGA) can be performed on nanocomposite compositions prepared at different screw speeds. Comparing compositions prepared at lower screw speeds to compositions prepared at higher screw speeds can reveal information on the effect of the screw speeds on the nanocomposite structure.

Thermograms can be obtained for different percentages of polymers added to graft polymer and filler nanocomposite compositions. Also, a comparative analysis of the thermal decomposition temperatures (e.g., onset temperature of decomposition and end temperature of decomposition) for different amounts of filler added to the nanocomposite composition can provide information about the effect of the interaction between the polymer and the filler in the nanocomposite composition. The char obtained at the end of thermogravimetric experiments for the different nanocomposite compositions can also be analyzed.

The nanocomposite compositions described herein have the desired effect of enhanced flame resistance, increased char formation, greater structural stability of char, increased decomposition temperature, decreased heat release rate, decreased mass loss rate, decreased peak smoke production rate, decreased average smoke production rate, and decreased average production rate of carbon dioxide and carbon monoxide.

Uses of the Nanocomposite Compositions

The nanocomposite compositions described herein can be used to make a wide variety of materials including, without limitation, packaging materials, thermal insulators, flame retardant fabrics, e.g., for clothing and furniture, protective garments, composite films (e.g., print films), molded plastics, automotive components, aviation components, furniture materials, mattress materials, carpets, and construction materials. Packaging and packing materials are materials used for the containment, protection, transportation handling, delivery, and/or presentation of goods (e.g., plastic film or sheet, loose-fill peanuts, bags, boxes, bubble wrap, or cushioning material). Thermal insulators can be used in electronics, tubes, clips, and washers and insulators for transistors. The nanocomposite compositions can be used for purposes that require a flame resistant and light weight fabric. Molded plastics include blow, compression, and injection molded plastics (e.g., that are used to manufacture plastic furniture and electrical and electronic components). Automotive and aviation components include, for example, seat backs, seat cushions, seat covers, dash board parts, cabin and door panels, and knobs. Furniture materials include, e.g., cushions, seat covers, structural part, rugs, and carpets. Construction materials include, for example, siding, tiles, wall paper, decorative materials, and insulation materials.

EXAMPLES

The invention is further described in the following examples, which do not limit the scope of the invention described in the claims. Methods of making, analyzing, and characterizing some embodiments of the nanocomposite composition are described below.

General

The isotactic polypropylene used in the Examples below (Sigma-Aldrich, Product Number 182389, CAS Number 25085-53-4, weight average molecular weight of approximately 250,000 by GPC) was used as received. The graft polymer used in the Examples below was a maleic anhydride grafted polypropylene (0.4 weight percent maleic anhydride, CAS number 25722-45-6). The graft polymer was purchased from Sigma-Aldrich and was dried prior to blending, as described below. The silica used in the Examples below was fumed silica, having a particle size in the range of about 7 nm to about 50 nm, a specific surface area of about 390+/−m$^2$/g, a formula weight of 60.08 g/mol and a bulk density of about 0.037 g/cm$^3$. The silica was obtained from Sigma-Aldrich, and was dried prior to blending, as described below.

Example 1

Methods of Making Nanocomposite Compositions

Nanocomposite compositions containing polypropylene or graft polypropylene with varying amounts (5% and 10% by weight) of fumed silica were prepared by first drying them separately in an oven at 90° C. for 24 hours. The graft polypropylene was mixed with a desired amount of fumed silica followed by melt blending using a Brabender Plasti-Corder® instrument at a desired screw speed (10, 50, or 100 rpm) for 30 minutes under an inert nitrogen atmosphere. Similarly, nanocomposite compositions containing graft polypropylene (0.5%, 2%, or 50% by weight) with varying amounts of fumed silica and isotactic polypropylene (as another polymer) were prepared by mixing graft polypropylene with varying amounts of fumed silica and isotactic polypropylene followed by melt blending at a desired screw speed of 50 rpm for 30 minutes, under an inert nitrogen atmosphere.

After melt blending, the nanocomposite compositions were compression molded into films about 0.5-1.0 mm thick using a Carver Laboratory Press at a temperature of 165° C. These films were used for thermal characterization studies of the nanocomposite compositions.

Example 2

Differential Scanning Calorimetry Experiments

Differential scanning calorimetry was performed on samples with different loading levels (5% and 10% by weight) of fumed silica in isotactic polypropylene and graft polypropylene matrices using a TA Instruments DSC Q1000® instrument coupled to Universal V4.1D analysis software. Nanocomposite samples in film form were cut into small sizes with mass ranging from 5-10 mg. These were placed in standard DSC crimped aluminum pans for testing. The experiments were carried out in an inert nitrogen atmosphere. The testing cycle adopted was a heat/cool/heat cycle, so as to erase any prior thermal history of the samples. The experimental cycle consisted of heating the samples to 250° C. at the rate of 10° C./min, cooling to −50° C. at a rate of 5° C./min, and then again heating to 250° C. at the rate of 10° C./min.

Figure 1B:
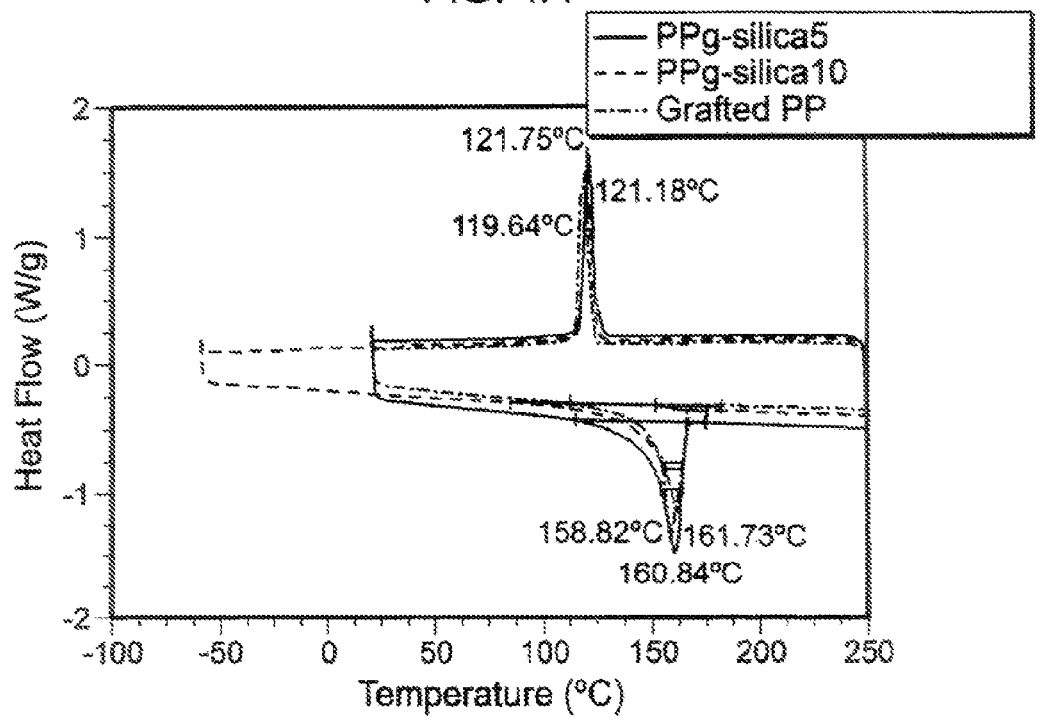

The heat flow was plotted against temperature for each of the samples to provide calorimetry curves. See FIGS. 1A and 1B for a comparison of the calorimetry curves for isotactic polypropylene (FIG. 1A) and graft polypropylene (FIG. 1B) for 5% and 10% filler, respectively (silica5 is 5 percent silica and silica10 is 10 percent silica in the figures; Isotactic PP and Grafted PP are the unfilled polymers in the figures). In both cases, the peak melting temperature was enhanced by 2-3° C. for 10% filler. The calorimetry curves show that the peak crystallization temperature was increased by almost 7° C. for both graft polypropylene samples compared to isotactic polypropylene samples. Without being bound by theory, it is believed that this increase in peak crystallization temperature is indicative of a change in morphology of the polymer due to the addition of fumed silica particles and of possible nucleation phenomena.

Example 3

Thermogravimetric Experiments

Thermogravimetric analysis of nanocomposite compositions were conducted to determine their decomposition behavior using a TA Instruments TGA Q500® instrument in an inert nitrogen atmosphere. The instrument is sensitive to a mass range of 0.1 g and can operate up to a temperature of 1000° C. Nanocomposite samples cut in small sizes of 10±2 mg were loaded into stainless steel pans and heated from room temperature to 900° C. at a rate of 20° C./min. The graphs obtained from the experiments were analyzed with Universal Analysis Software (Universal V4.1D) to obtain weight loss decomposition profiles and the percentage of residue. Comparative analysis for different types of nanocomposite compositions and control samples were conducted to investigate the effect of nano-filler addition and level of interaction on the thermal stability of polypropylene.

Thermogravimetric analysis performed on graft polypropylene and fumed silica compositions prepared at a higher screw speed of 100 rpm showed a higher decomposition temperature compared to the compositions prepared at lower screw speeds of 10 rpm and 50 rpm. Without being bound by theory, it is believed that the higher decomposition temperature at higher screw speeds could be caused by a higher probability of interaction between the filler and the polymer due to more vigorous mixing.

Figure 2A:
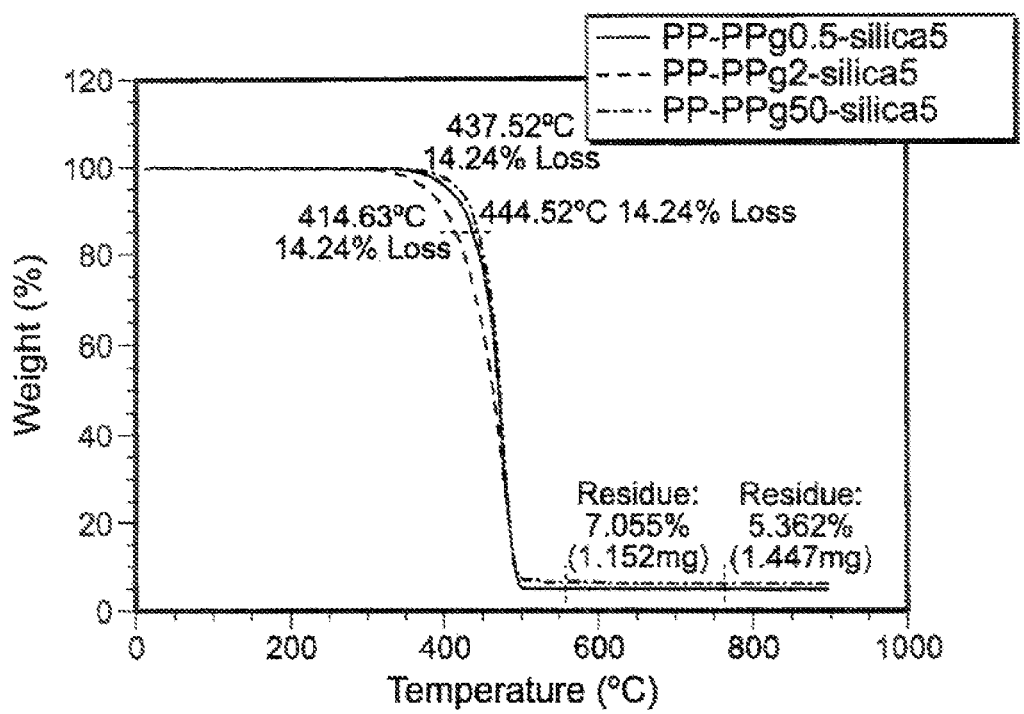
FIGS. 2A and 2B are comparative thermogravimetric analysis curves of 0.5%, 2% and 50% of graft polypropylene (maleic anhydride) added to polypropylene fumed silica systems at loading levels of 5% and 10% fumed silica, respectively.
Figure 2B:
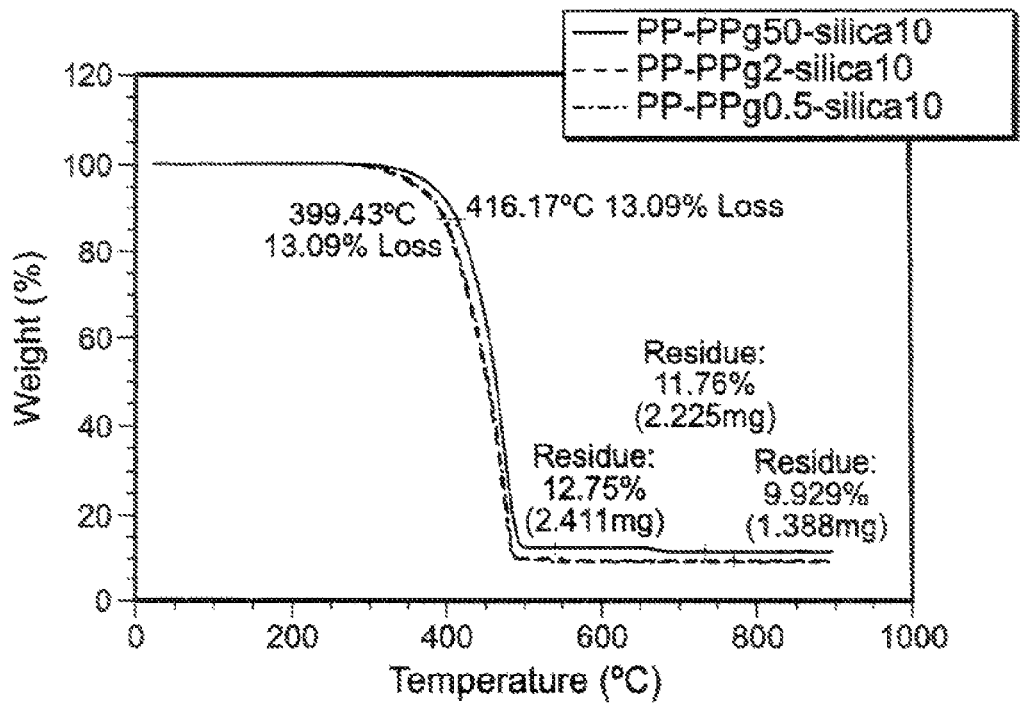

Thermograms obtained for different percentages of graft polypropylene added polypropylene silica compositions showed higher decomposition temperatures for compositions containing higher amounts of graft polypropylene (50% by weight). FIG. 2A shows a graph for 5 percent filler (silica5 in the figure) at varying amounts of graft polypropylene in polypropylene (PP-PPg0.5, PP-PPg2 and PP-PPg50 are 0.5 percent graft polypropylene in polypropylene, 2.0 percent graft polypropylene and 50 percent graft polypropylene in polypropylene, respectively), while 2B shows a graph for 10% filler addition (silica10 in the figure). These graph presents the decomposition profiles of 0.5%, 2%, and 50% of graft polypropylene in polypropylene silica compositions. Collectively, the graphs show that the 50% graft polypropylene has a higher decomposition temperature than that of 0.5% and 2% graft polypropylene. In particular, FIG. 2A shows that the decomposition of 2% graft polypropylene nanocomposite composition occurs at a temperature almost ~22° C. lower than that of 0.5% graft polypropylene.

Figure 3A:
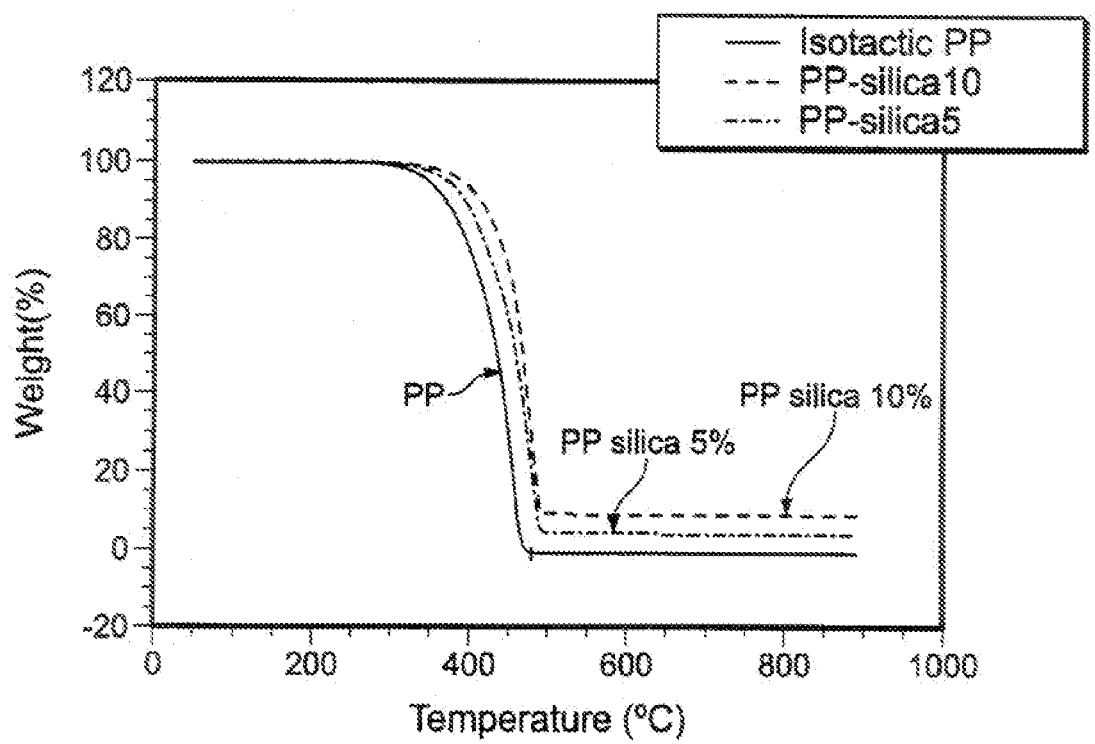
FIGS. 3A and 3B are comparative thermogravimetric analysis curves for various percentages of filler addition for polypropylene nanocomposite compositions and graft polypropylene (maleic anhydride) nanocomposite compositions, respectively.
Figure 3B:
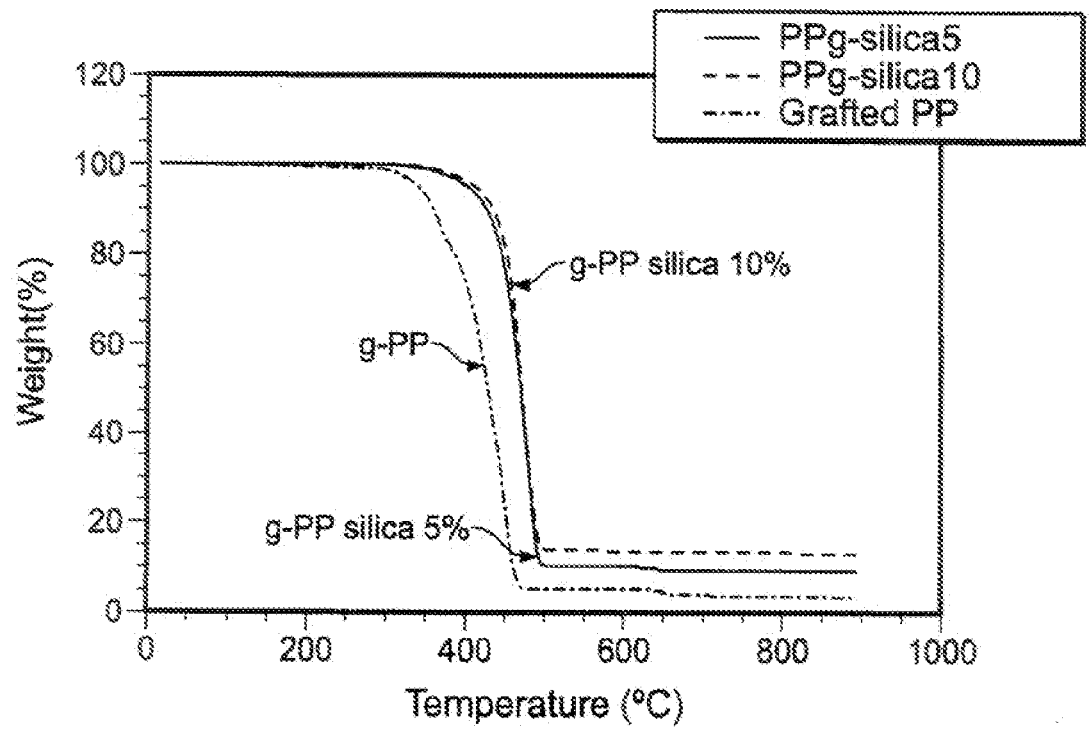

Comparative analysis of different amounts of filler added to the graft polypropylene composition indicated a steep rise in decomposition temperature with increasing amounts of filler (see FIGS. 3A and 3B). There was a greater rise in thermal decomposition temperatures in graft polypropylene/fumed silica compositions (FIG. 3B) compared to isotactic polypropylene/fumed silica compositions (FIG. 3A). For example, adding 10% fumed silica to graft polypropylene (see PPg-silica10 in FIG. 3B) resulted in a rise of 70° C., whereas adding 10% fumed silica to isotactic polypropylene (see PP-silica10 in FIG. 3A) resulted in only a rise of around 42-44° C. Comparative thermograms between isotactic and graft polypropylene compositions also showed similar results. The onset temperature of decomposition, as well as the peak temperature at maximum decomposition were also higher for graft polypropylene compositions.

Figure 4A:
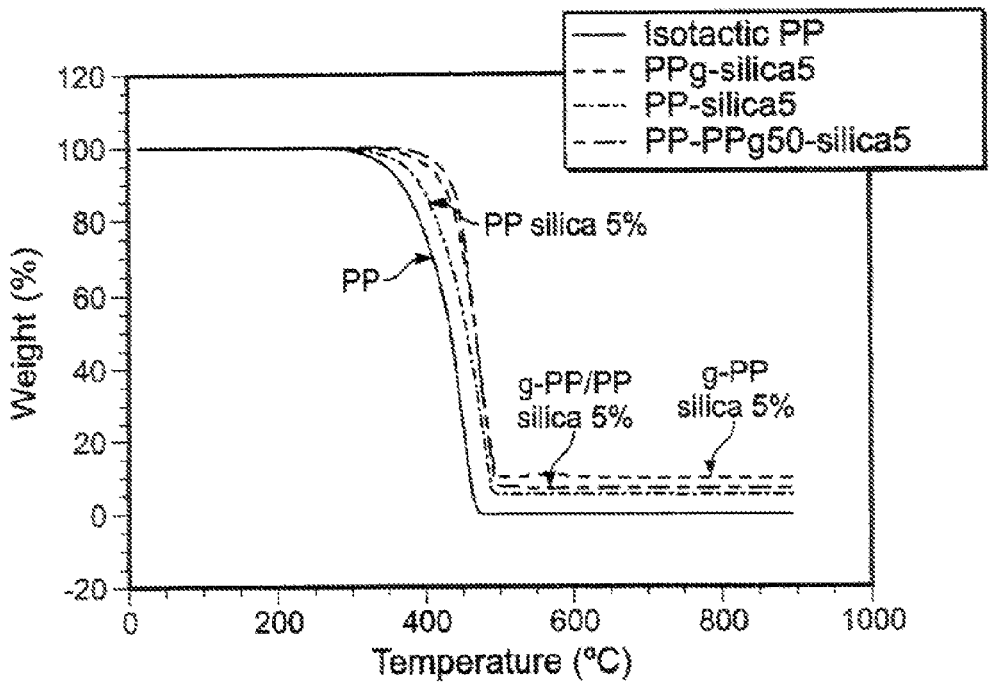
FIGS. 4A and 4B are comparative thermogravimetric analysis curves of the effect of filler addition to polypropylene and graft polypropylene (maleic anhydride) at loading levels of 5% and 10% fumed silica, respectively.
Figure 4B:
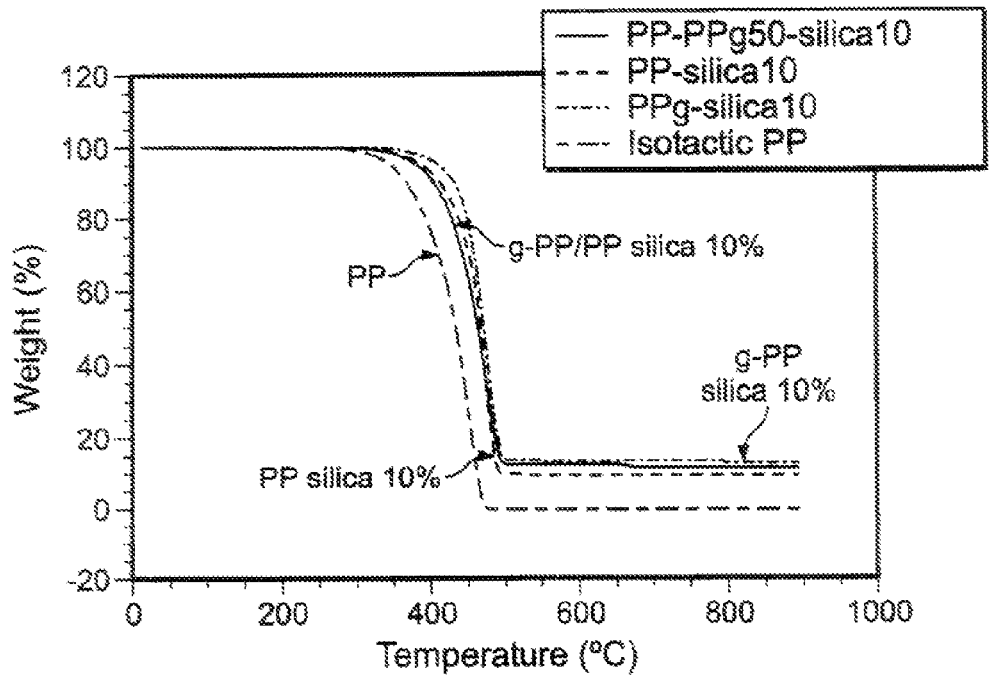
Figure 5A:
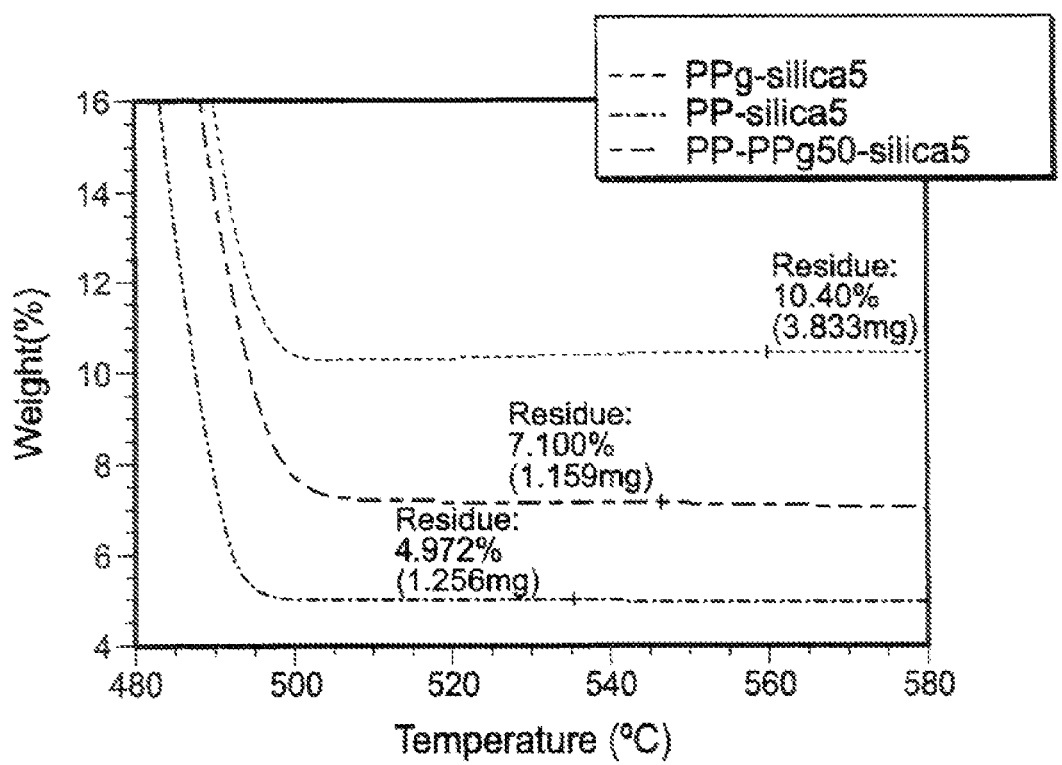
FIGS. 5A and 5B are thermal decomposition profiles representing residue for different nanocomposite compositions.
Figure 5B:
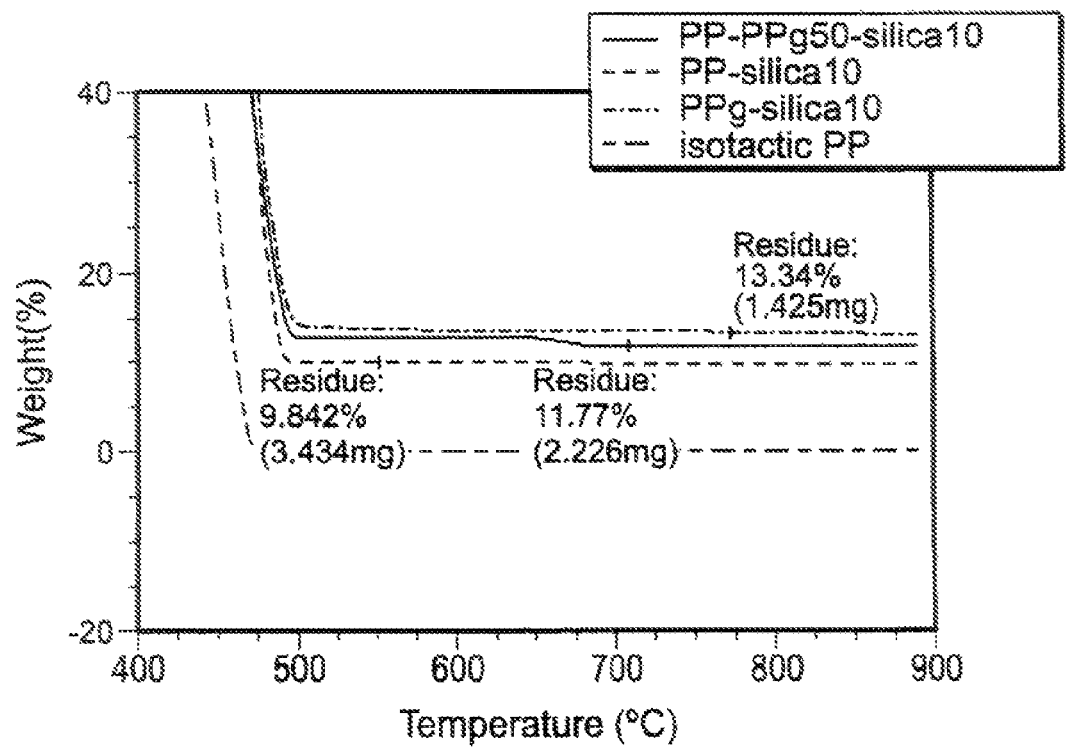

The overall effect of addition of fumed silica as filler to both isotactic and graft polypropylene is shown in FIGS. 4A and 4B. For 5 wt % of fumed silica addition, polypropylene nanocomposite compositions show about 20° C. rise in thermal decomposition temperature, whereas graft polypropylene nanocomposite compositions show a 44-47° C. rise in decomposition temperature. Interestingly, the polypropylene/graft polypropylene/silica systems for 5% filler addition show a 48.5-50° C. rise in decomposition, which is similar to that shown by graft polypropylene nanocomposites. In the case of 10 wt % silica addition, polypropylene nanocomposites show 40-41° C. increase in decomposition temperature whereas the increase for graft polypropylene nanocomposite compositions is 51-53° C. The amount of residue left in both cases is shown in FIGS. 5A and 5B. Thus, graft polypropylene nanocomposite compositions yield 3-5% carbonaceous char (discounting the amount of silica added initially) at the end of the decomposition process, both for 5% and 10% of filler addition. Polypropylene/graft polypropylene/silica systems yield a 1-2% carbonaceous char in each case.

Without being bound by theory, it is believed that this higher decomposition temperature of graft polypropylene compositions is indicative of the effect of interaction between graft polypropylene and silica making the polymer more thermally stable. The char obtained at the end of thermogravimetric experiments was also different for isotactic and graft polypropylene. While the residue after decomposition of isotactic polypropylene fumed silica compositions was mostly silica particles in fluffy powdery form, the residue obtained for graft polypropylene fumed silica compositions was brittle, yet monolithic, essentially retaining the shape of the original polymer.

Example 4

Flame Resistance Experiments

Cone calorimetry was used to observe and analyze the combustion behavior of nanocomposite composition samples. The facial area of the samples needs to be 100 mm$^2$, although the thickness may vary from 3-50 mm. The cone calorimeter instrument works on the principle of oxygen consumption calorimetry. The testing is based on ASTM E 1354 "Standard Test Method for Heat and Visible Smoke Release Rates for Materials and Products Using an Oxygen Consumption Calorimeter." The instrument has a radiant heating element in the form of a truncated cone positioned above the samples, which are placed horizontally. The instrument was used to quantitatively determine the following flammability characteristics: peak heat release rate, peak mass loss rate, heat of combustion, ignition time, percentage residue left, smoke production rate, smoke yield, carbon monoxide production rate, and carbon dioxide production rate.

Sample slabs of 100 mm×100 mm×6 mm, prepared using a Carver Laboratory Press, were used for the experiment. The samples were placed beneath the heating element of the instrument and provided with a constant heat flux of 35 kW/m$^2$. The heated samples were ignited with the help of an intermittent spark igniter placed 13 mm above the samples. Upon the onset of burning, the combustion fumes emanating from the sample were captured through an exhaust duct system in the instrument. This enabled determination of smoke obscuration and heat release parameters. A load cell connected to the sample base continuously monitored the sample mass. Relevant graphs for all these characteristics were obtained using a computer attached to the instrument.

Comparison of relative flame retardancy of different nanocomposite samples in terms of the aforementioned characteristics were used to understand the effect of the varying degrees of polymer/filler interaction. The experimentation also enabled visual observation of char formation and the determination of physical characteristics of char formed. This was important in determining the role of the filler during combustion in air. At the same time, the residue obtained from this process was subjected to further investigation to ascertain its chemical composition.

Figure 6A:
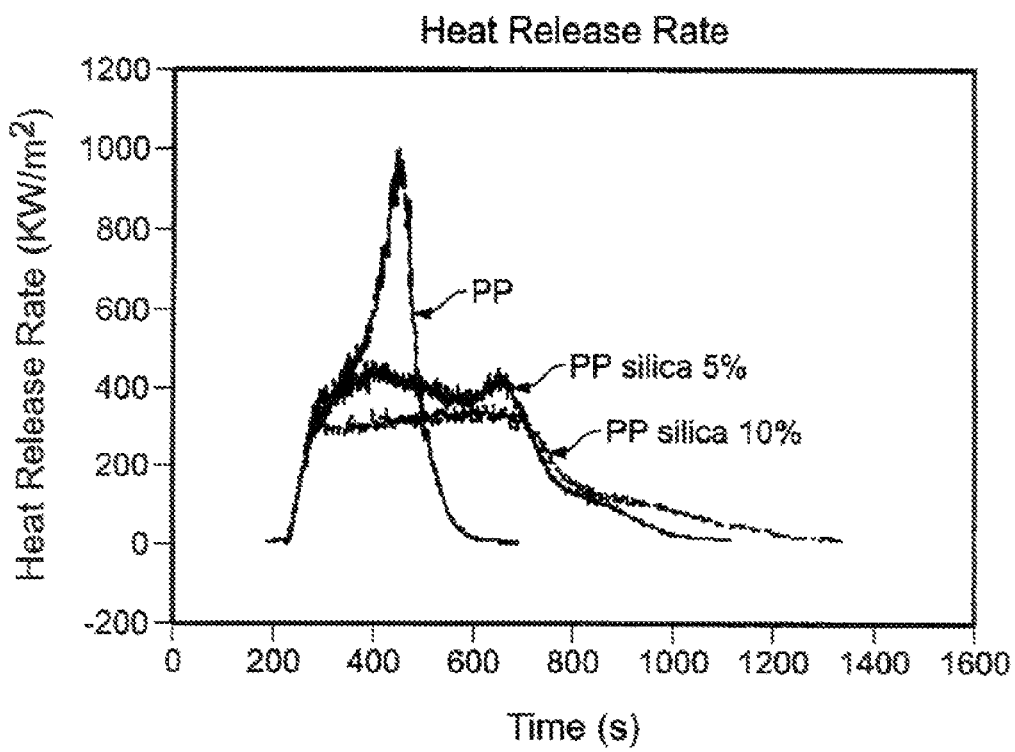
FIGS. 6A and 6B are heat release rate curves representing 5% and 10% filler addition for PP nanocomposite compositions and graft polypropylene (maleic anhydride) nanocomposite compositions.
Figure 6B:
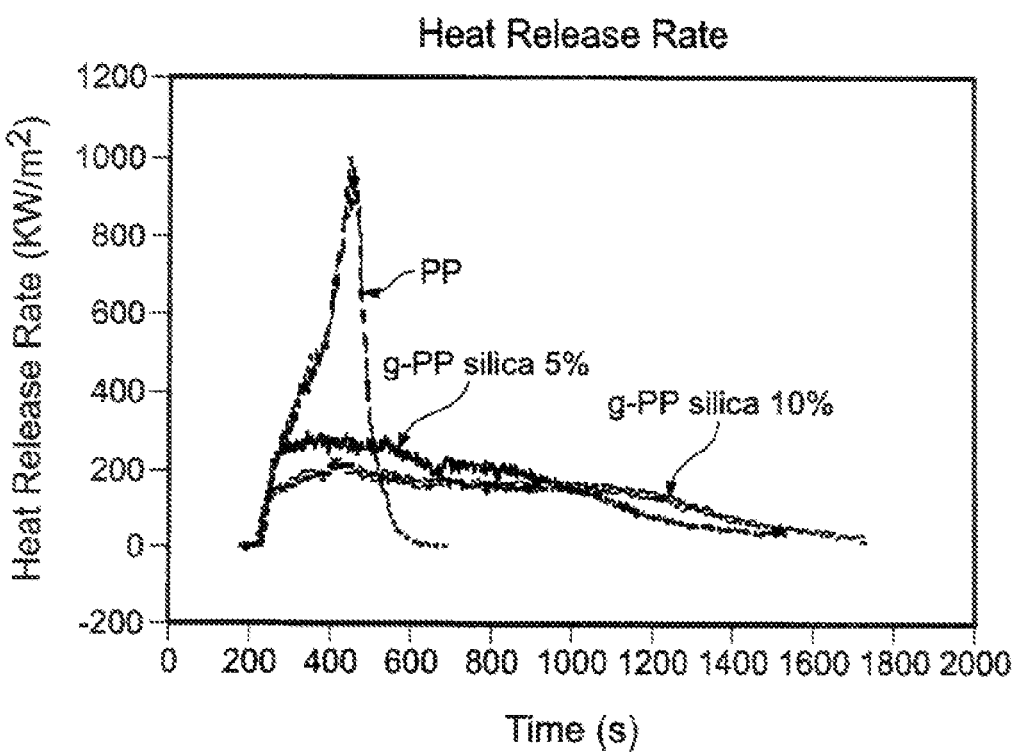
Figure 7A:
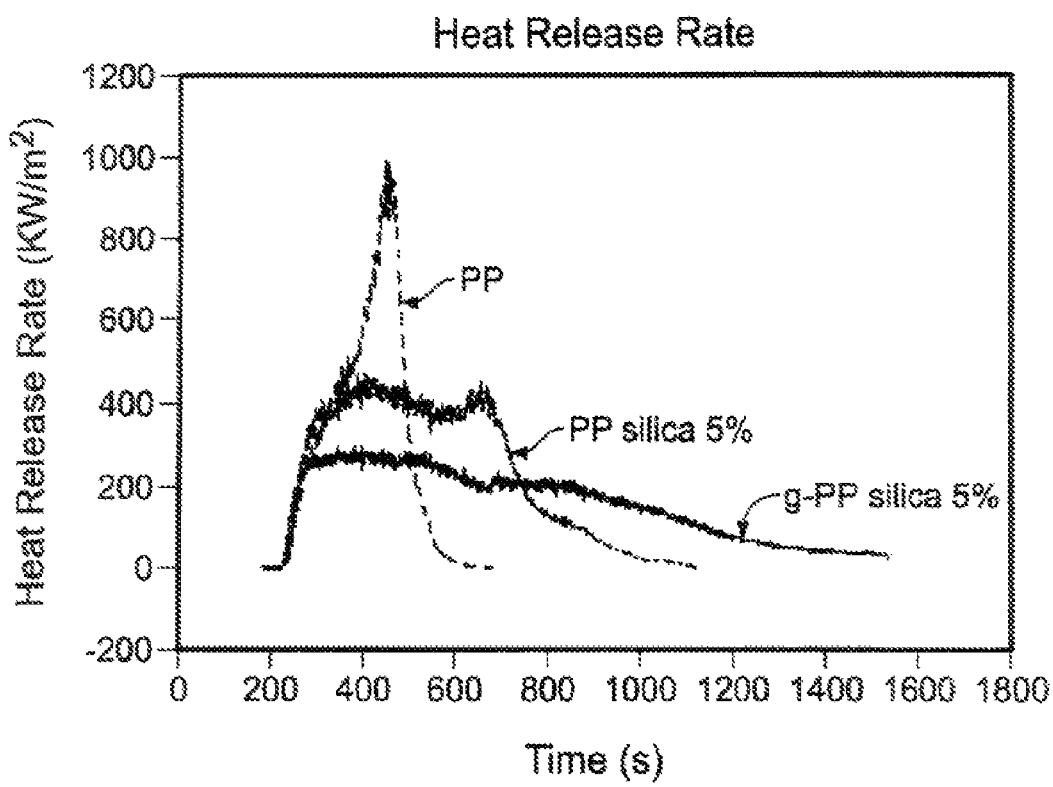
FIGS. 7A and 7B are heat release rate plots depicting the effect of interaction between graft polypropylene (maleic anhydride) and silica at loading levels of 5% and 10% fumed silica, respectively.
Figure 7B:
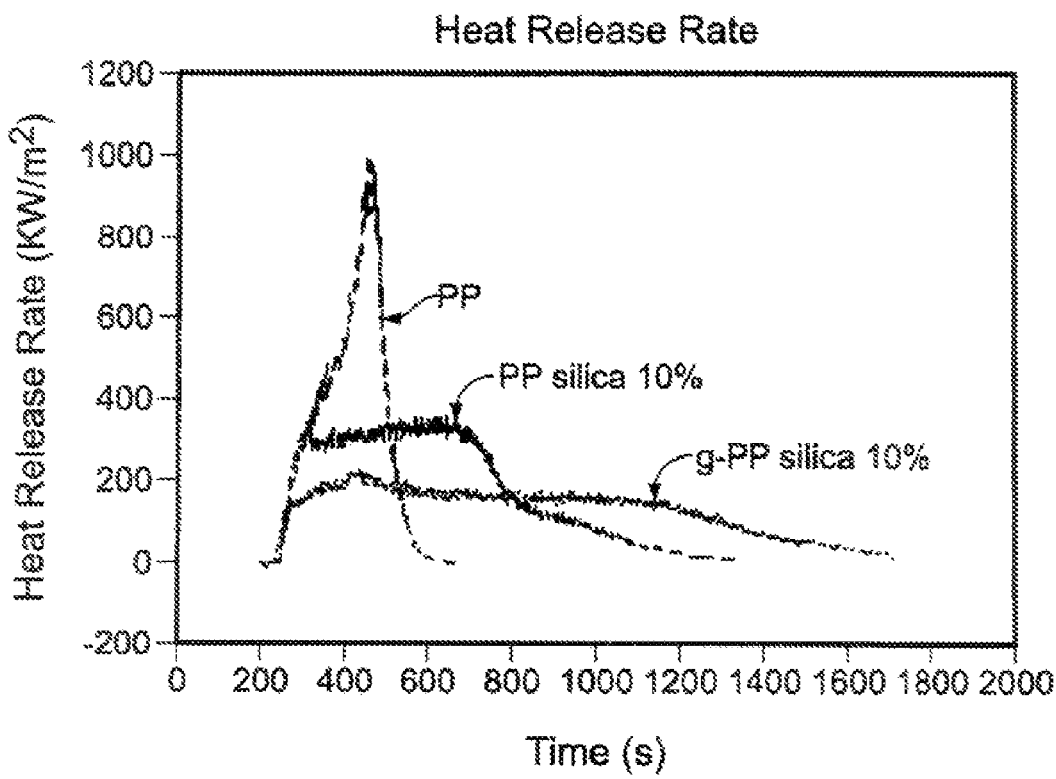

FIGS. 6A and 6B show the effect of filler addition on the heat release rates of polypropylene and graft polypropylene. Addition of 5 wt % fumed silica to polypropylene reduced the peak heat release rate by 53.3% (standard deviation±2%), whereas 10 wt % fumed silica reduced the peak heat release rate by 64.3% (standard deviation±2%). Without being bound by theory, it is believed that the reduction in heat release rate may be due to the formation of fumed silica aggregates on top of the burning polymer. FIGS. 7A and 7B compare the reduction in peak heat release rate of the isotactic polypropylene and graft polypropylene nanocomposite compositions with respect to the neat polymer. As can be seen from these figures, there is about a 37% relative difference in the peak heat release rate between the polypropylene nanocomposite compositions and graft polypropylene nanocomposite compositions, for both 5 wt % and 10 wt % filler addition. Without being bound by theory, it is believed that this shows the effect caused by the interaction between graft anhydride groups on polypropylene and silanol groups on silica.

Figure 8A:
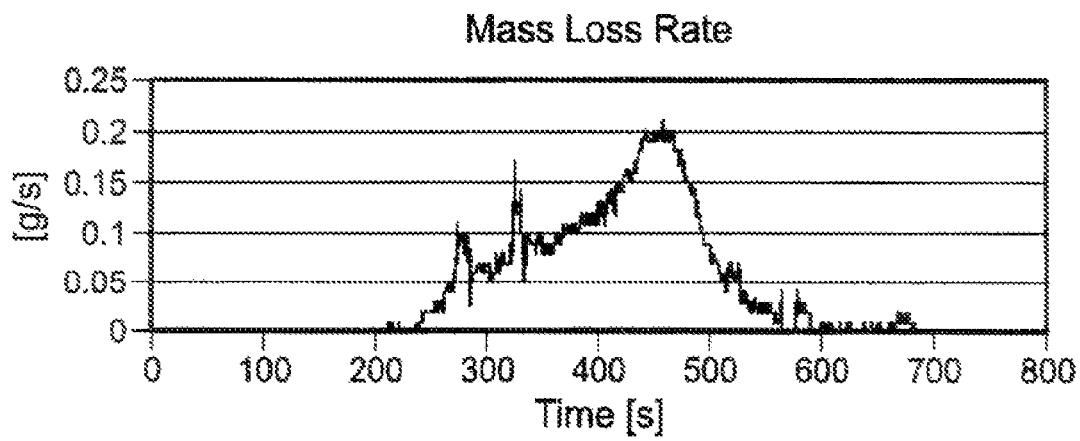
FIGS. 8A, 8B, and 8C are mass loss rate curves for neat isotactic polypropylene, polypropylene silica nanocomposite at 5% filler addition, and graft polypropylene (maleic anhydride) silica nanocomposite compositions at 5% filler addition.
Figure 8B:
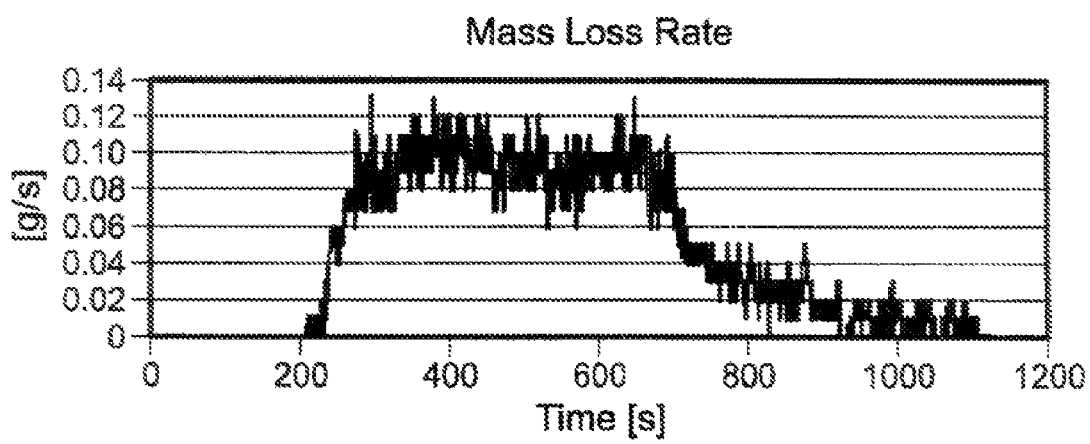
Figure 8C:
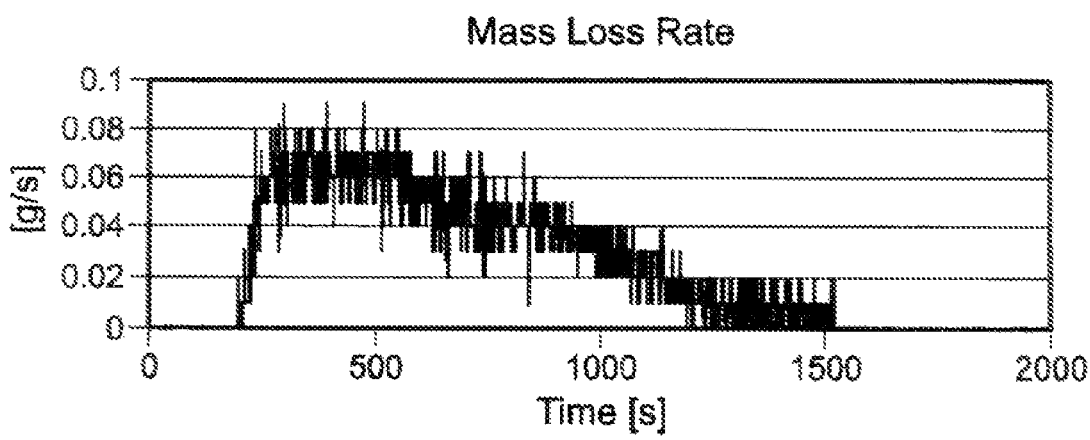
Figure 9A:
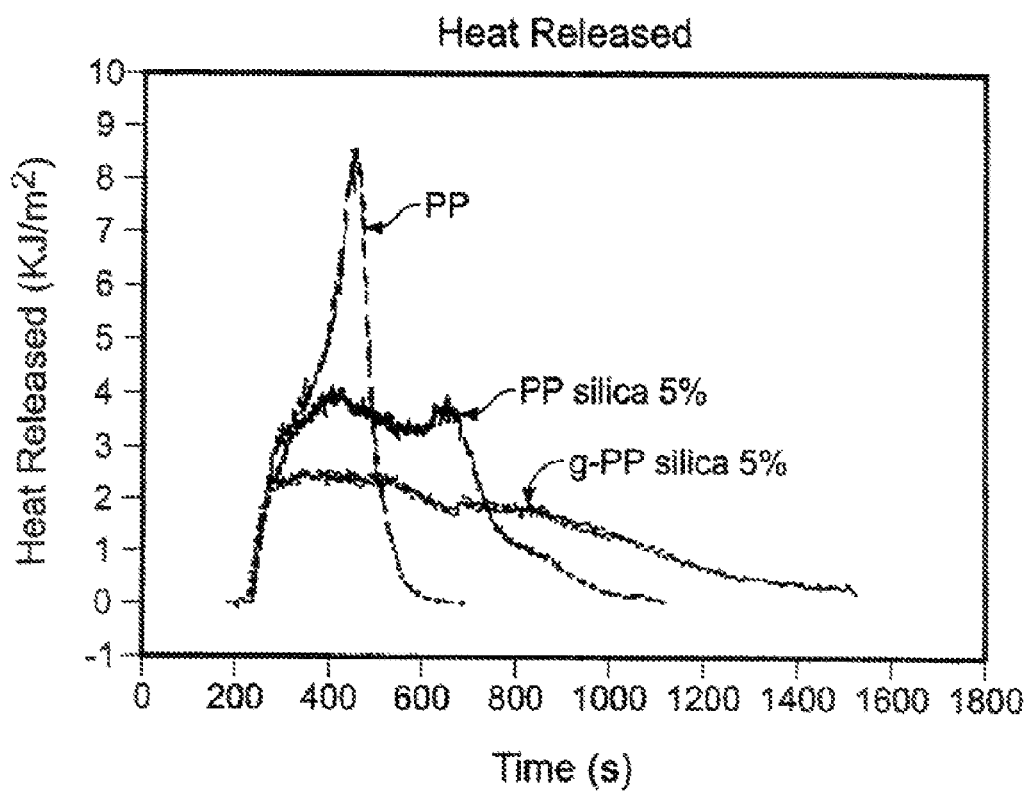
FIGS. 9A and 9B are heat released plots for neat polypropylene, polypropylene nanocomposite compositions, and graft polypropylene (maleic anhydride) nanocomposite compositions.
Figure 9B:
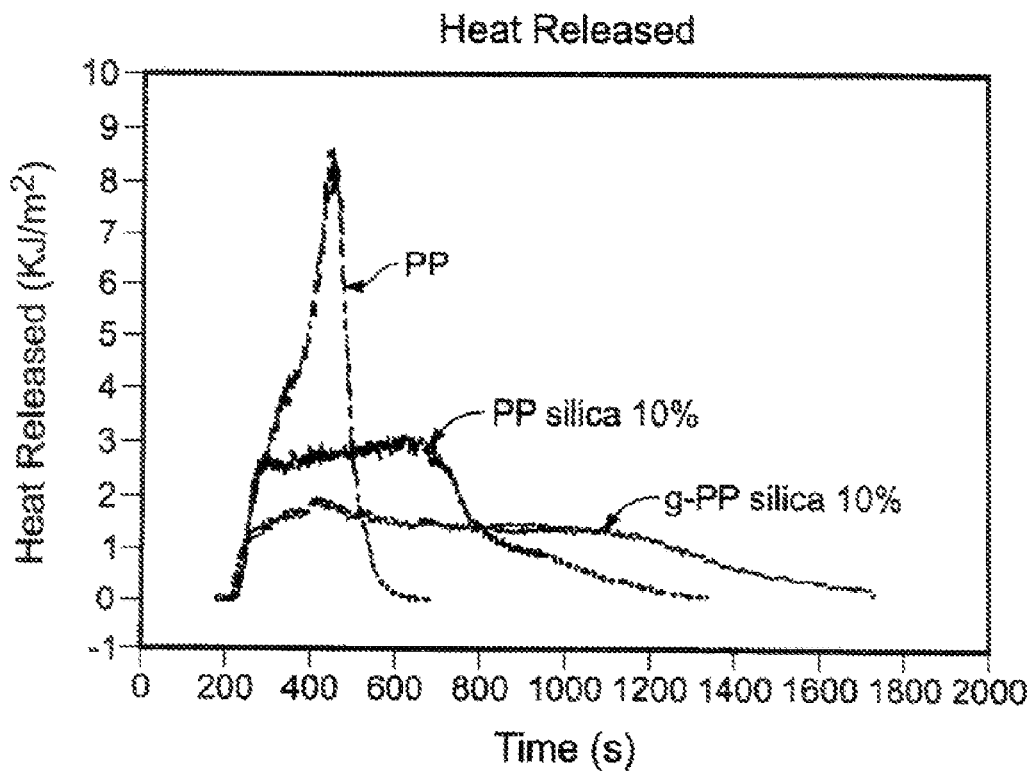

The mass loss curves also followed a similar trend as the heat release rate plots. The graft polypropylene/silica nanocomposite compositions showed the highest reduction in peak mass loss rates. FIGS. 8A, 8B, and 8C show the mass loss curves for neat isotactic polypropylene, polypropylene silica nanocomposite at 5% filler addition, and graft polypropylene silica nanocomposite compositions at 5 wt % filler addition, respectively. To facilitate comparison of the instantaneous heat released for various samples, a set of plots (FIGS. 9A and 9B) were drawn. These plots give an indication of the amount of heat released during the whole process, rather than the rate of heat released. FIGS. 9A and 9B show plots for 5 wt % and 10 wt % filler addition. Thus, the total heat released is also significantly reduced upon addition of fumed silica to the polypropylene matrix.

Figure 10A:
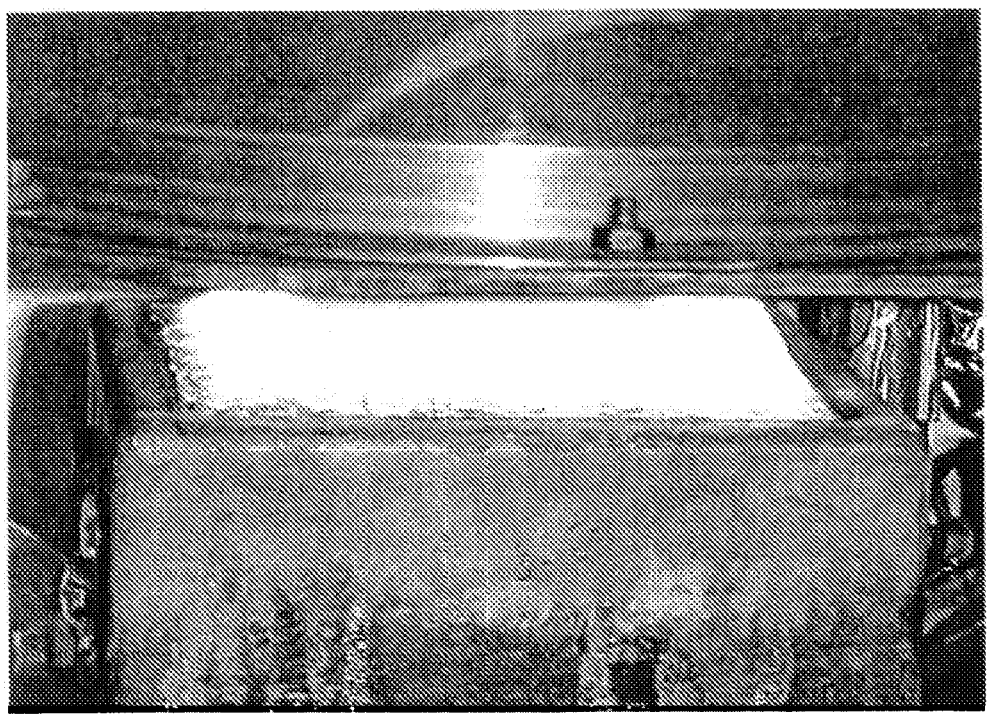
FIGS. 10A-10H are digital images taken during cone calorimeter combustion experiments on various polymers.
Figure 10B:
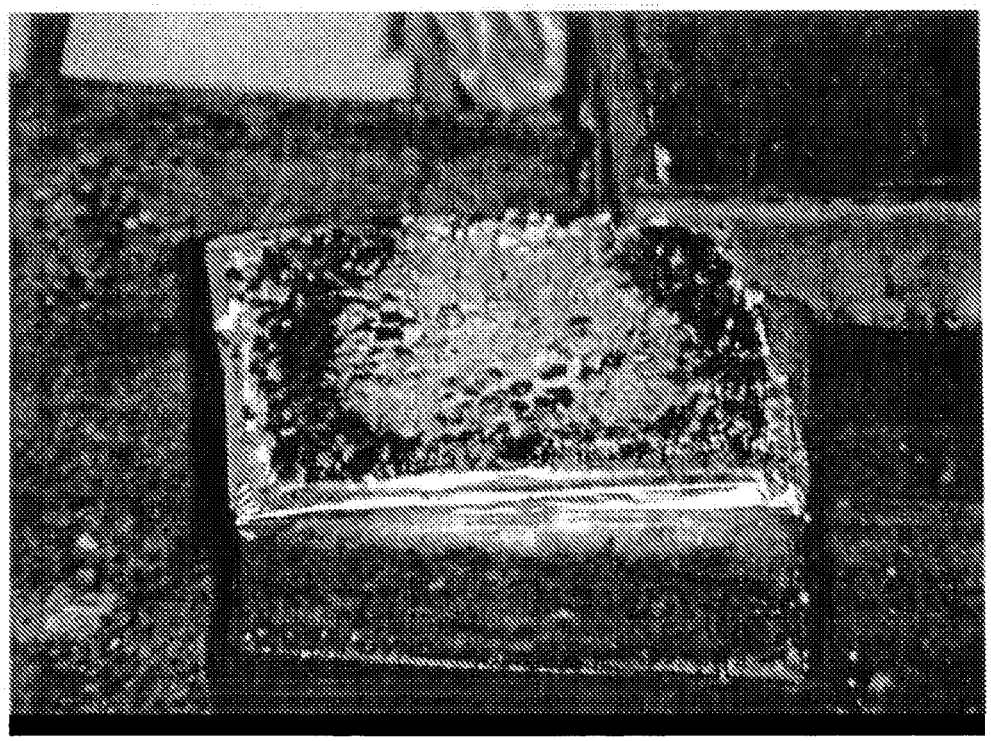
Figure 10C:
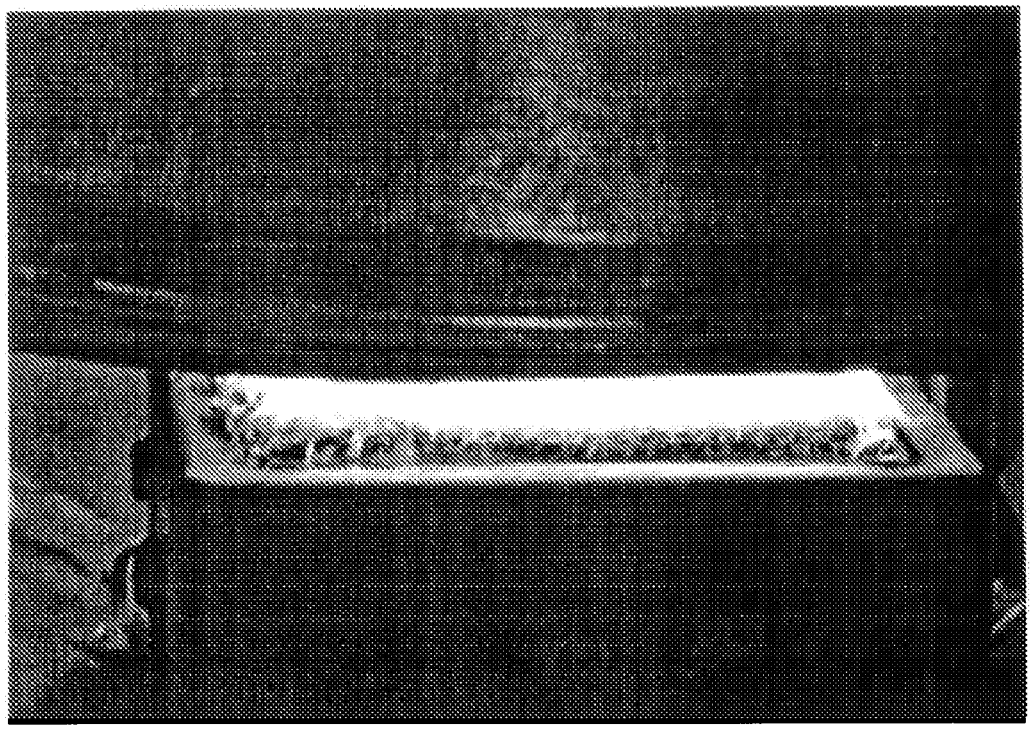
Figure 10D:
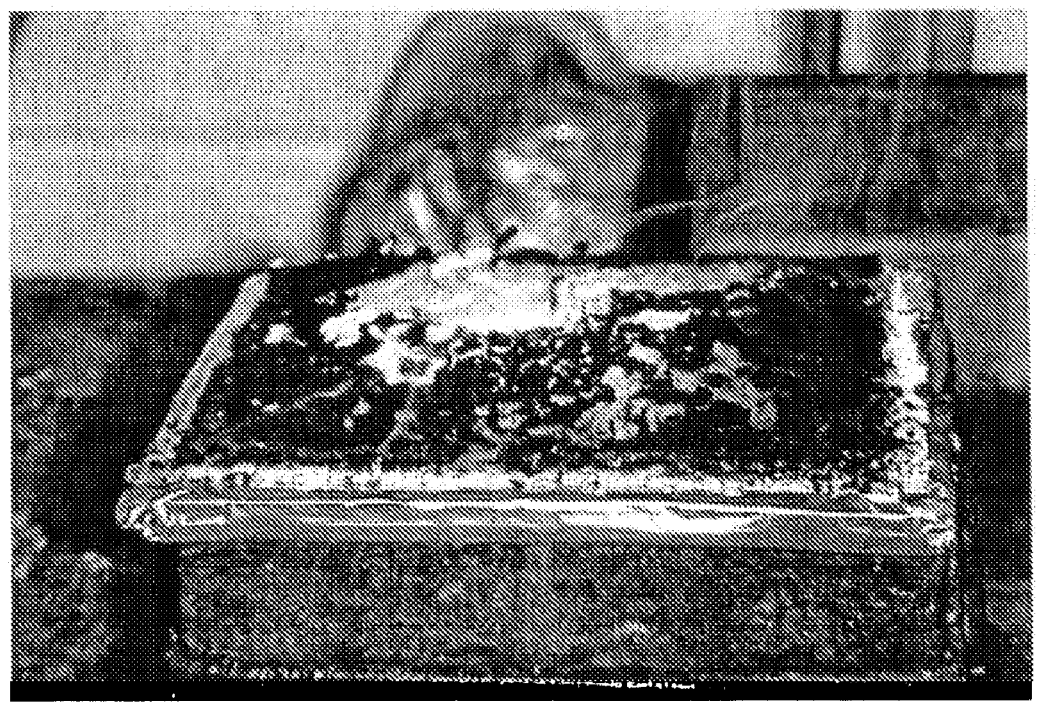
Figure 10E:
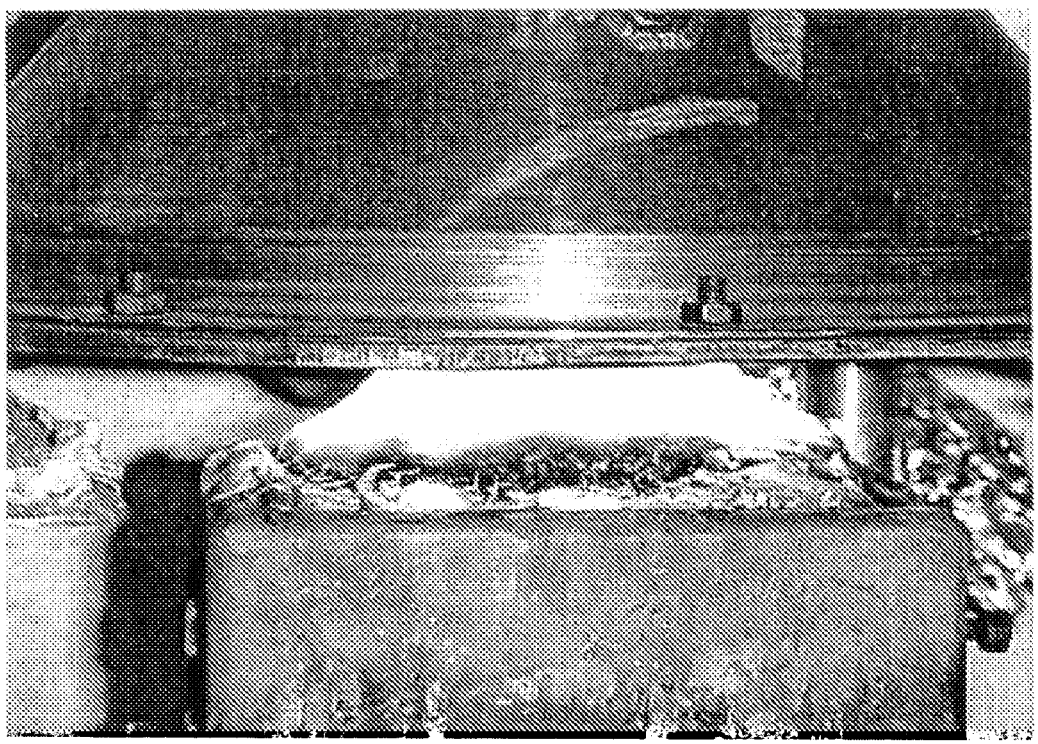
Figure 10F:
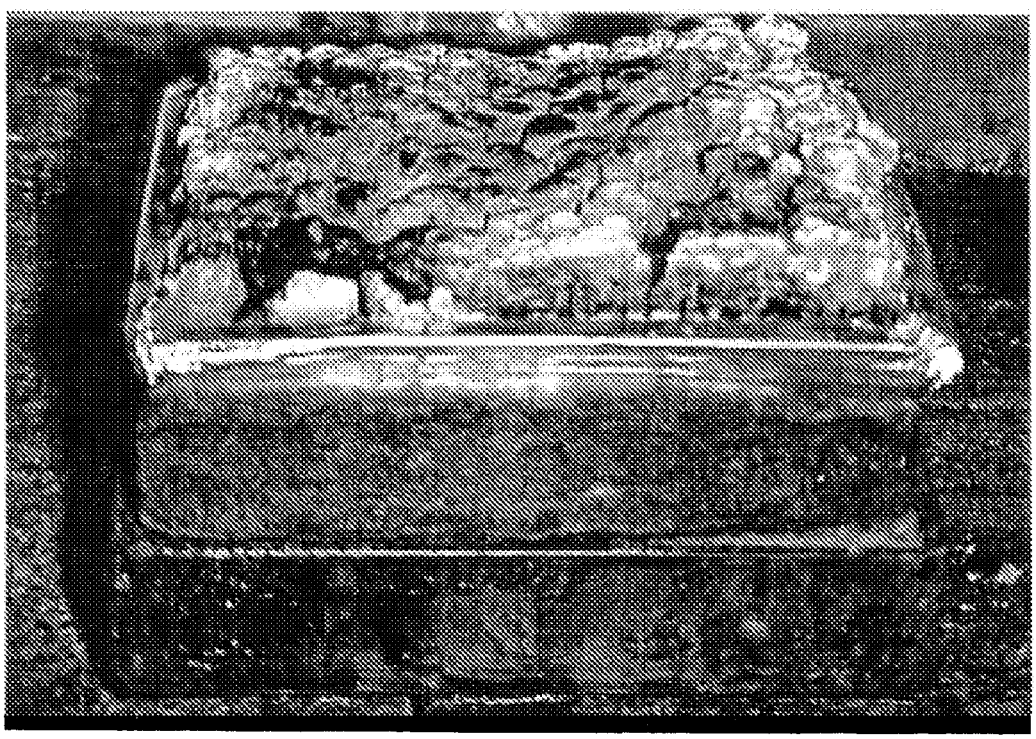
Figure 10G:
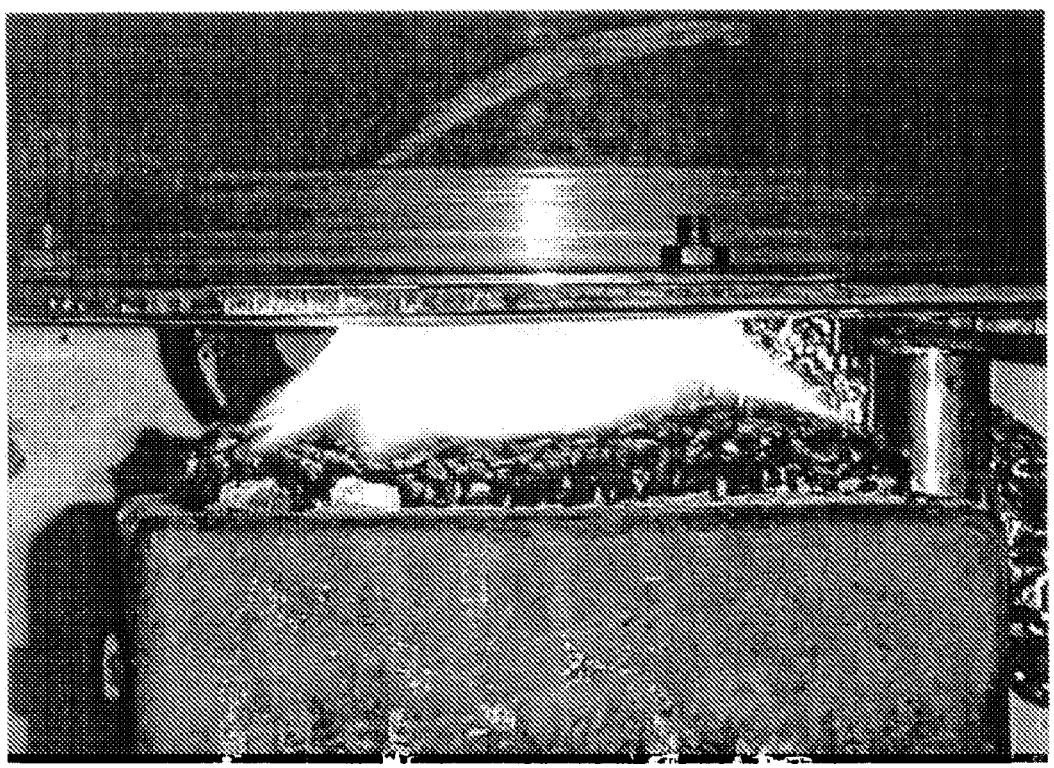
Figure 10H:
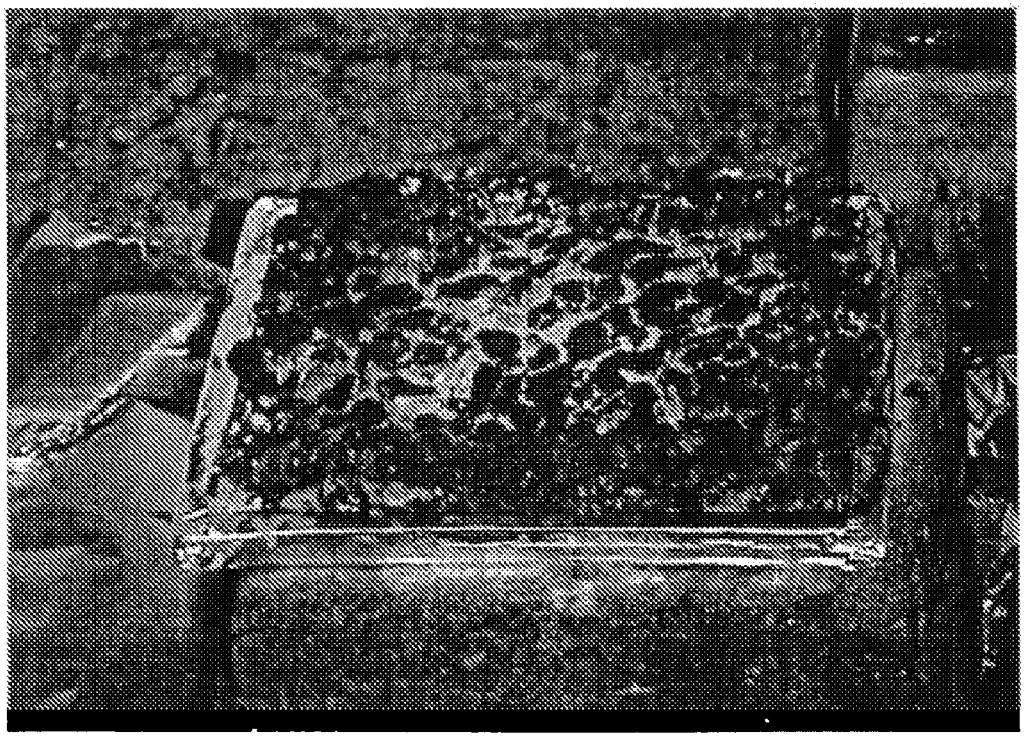

During combustion of neat isotactic polypropylene, the specimen melted, started to boil shortly after ignition, and continued until flame out. The specimen did not remain as a contiguous mass, but instead melted and flowed shortly after ignition. No char was left at the end of the test as the whole specimen was pyrolyzed. Similar behavior was also observed for neat graft polypropylene. In the case of polypropylene silica nanocomposites, the specimen did not boil, but intumesced about 12-14 mm in height, giving rise to a white crusty char with some blackening at the sides. Intumescence, however, retarded as the specimen continued to burn. At the end of the combustion experiment, the specimen left behind a white, powdery, fluffy char. In the case of graft polypropylene silica nanocomposites, the burning process again did not show boiling; rather, the specimen again intumesced about 12-13 mm in height, but this time gave a blackened, large, flaky char which was uniform and stable. There was also some white powdery char beneath the blackened surface char. At the end of the combustion experiment, the specimen left behind a considerable amount of char, which was thicker than the char left behind by isotactic polypropylene nanocomposites. Further inspection of the char revealed it to be brittle and flaky in contrast to the powdery fluffy char left behind in the former case. FIGS. 10A-10H are digital images taken during the combustion experiments on various polymers. FIGS. 10A and 10B represent polypropylene/silica 5%, FIGS. 10C and 10D represent polypropylene/silica 10%, FIGS. 10E and 10F represent graft polypropylene/silica 5%, and FIGS. 10G and 10H represent graft polypropylene/silica 10%. The thickness and stable structure of the char of graft polypropylene nanocomposites can be clearly seen in the above figures.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A nanocomposite composition comprising:
   a graft polymer comprising a base polymer modified with a polar grafting agent; and
   nano-sized silica particles comprising silanol surface groups, wherein the graft polymer is blended with the silica particles, and wherein 1% to 10% by weight of the composition is silica.
2. The nanocomposite composition of claim 1, further comprising a non-graft polymer.
3. The nanocomposite composition of claim 1, wherein the base polymer comprises a polyolefin, polydiene, polyacrylate, polystyrene, polysiloxane, polyether, poly(vinyl aromatic), poly(vinyl halide), epoxy, polycarbonate, silicone, polyester, synthetic rubber, polyurethane, nylon, polyketone, or poly(phenylene oxide).
4. The nanocomposite composition of claim 1, wherein the base polymer comprises polyolefin.
5. The nanocomposite composition of claim 1, wherein the base polymer comprises polypropylene.
6. The nanocomposite composition of claim 1, wherein the nano-sized silica comprises fumed silica, colloidal silica, or fused silica.
7. The nanocomposite composition of claim 1, wherein the nano-sized silica comprises fumed silica.
8. The nanocomposite composition of claim 1, wherein 1% to 10% by weight of the composition is fumed silica.
9. The nanocomposite composition of claim 1, wherein 1% to 5% by weight of the composition is fumed silica.
10. The nanocomposite composition of claim 1, wherein the nano-sized silica has a particle size in the range of about 1 nm to 500 nm.
11. The nanocomposite composition of claim 1, wherein the nano-sized silica has a particle size in the range of about 1 nm to 50 nm.
12. The nanocomposite composition of claim 1, wherein the grafting agent comprises an acid anhydride, arylalkene, alkene, alkoxyalkene, acid, carboxyalkene, alkene carboxylate, imide, or arylimide.
13. The nanocomposite composition of claim 1, wherein the grafting agent comprises maleic anhydride.
14. The nanocomposite composition of claim 1, wherein 0.5% to 98% by weight of the composition is the graft polymer.
15. The nanocomposite composition claim 1, wherein 2% to 80% by weight of the composition is the graft polymer.
16. The nanocomposite composition of claim 1, wherein 50% to 90% by weight of the composition is the graft polymer.
17. The nanocomposite composition of claim 1, further comprising a fire retardant.
18. A packaging material, comprising the composition of claim 1.
19. A thermal insulator, comprising the composition of claim 1.
20. A flame retardant fabric, comprising the composition of claim 1.
21. A protective garment, comprising the composition of claim 1.
22. A composite film, comprising the composition of claim 1.
23. An automotive component, comprising the composition of claim 1.
24. An aviation component, comprising the composition of claim 1.
25. A furniture material, comprising the composition of claim 1.
26. A mattress material, comprising the composition of claim 1.
27. A carpet, comprising the composition of claim 1.

* * * * *

UNITED STATES PATENT AND TRADEMARK OFFICE
CERTIFICATE OF CORRECTION

| | | |
|---|---|---|
| PATENT NO. | : 8,143,339 B2 | Page 1 of 1 |
| APPLICATION NO. | : 11/860892 | |
| DATED | : March 27, 2012 | |
| INVENTOR(S) | : Warner et al. | |

It is certified that error appears in the above-identified patent and that said Letters Patent is hereby corrected as shown below:

In the Specification

Column 1, line 12, insert

-- GOVERNMENT SUPPORT

This invention was made with government support under Grant Number 02-0740 awarded by the U.S. Department of Commerce. The government has certain rights in the invention. --

Signed and Sealed this
Fourteenth Day of July, 2015

Michelle K. Lee
*Director of the United States Patent and Trademark Office*